June 19, 1962  R. J. LENDER  3,040,253
DUAL MAGNET ELECTRICAL INSTRUMENT
Filed Aug. 26, 1959  2 Sheets-Sheet 1
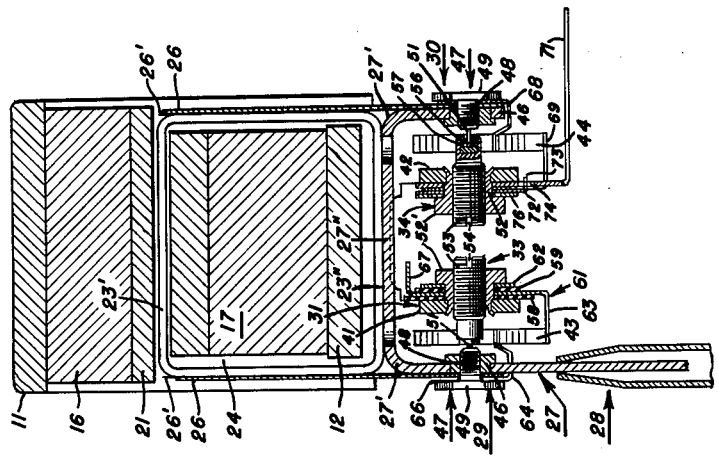
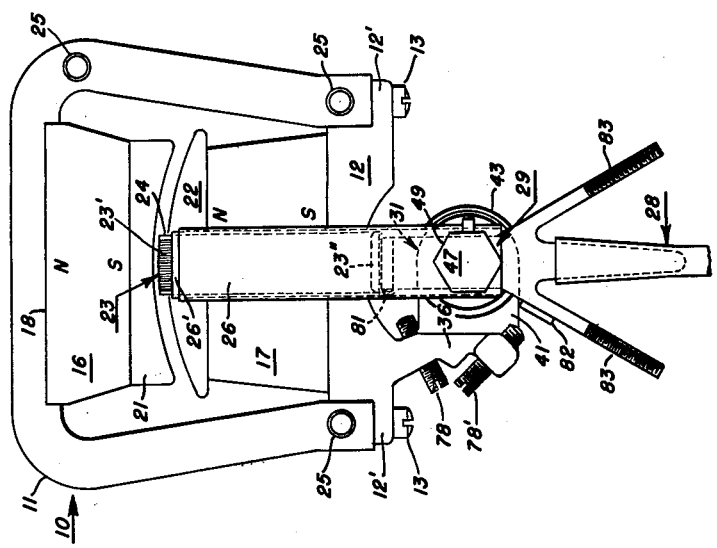
ROBERT J. LENDER
INVENTOR.
BY
*Rudolph J. Quick*
ATTORNEY

United States Patent Office 3,040,253
Patented June 19, 1962

3,040,253
DUAL MAGNET ELECTRICAL INSTRUMENT
Robert J. Lender, Cranford, N.J., assignor, by mesne assignments, to Daystrom Incorporated, Murray Hill, N.J., a corporation of Texas
Filed Aug. 26, 1959, Ser. No. 836,128
7 Claims. (Cl. 324—150)

This invention relates to an electrical instrument and more particularly to a permanent magnet, movable coil instrument having an improved magnetic system, bridge, and rotatable coil supporting structure.

The invention contemplates the provision of an instrument mechanism of high sensitivity and high torque for use, for example, in airborne equipment such as director pointers in attitude indicators and in any other high torque meter application where large, massive pointers are required and the scale range is limited to approximately 50° or less. The instrument magnetic system includes, preferably, a two piece soft-iron yoke which forms an enclosure, and a pair of permanent magnets disposed within the yoke. The yoke forms a shield for the magnets whereby only a low external magnetic flux field is produced by the instrument and, conversely, the magnets are shielded from stray external magnetic fields. This latter self-shielding arrangement results in small space and low weight requirements for the instrument, which factors are of particular importance in aircraft use.

The two magnets are mounted on diametrically opposite legs of the said two piece yoke with a magnet on each yoke member. The magnets are preferably provided with pole shoes at the free ends thereof; the pole shoes being provided with arcuate surfaces and located a spaced distance apart to form a magnetic flux gap therebetween. The magnets are oriented in a series aiding relation such that a high flux density obtains in the air gap therebetween. A wire wound movable coil is pivotally mounted for rotation in the flux gap in response to current conducted to the coil. One side of the wire turns operates in the flux gap with the other side positioned outside of the enclosure formed by the yoke. The coil is mounted for rotation about a pivot axis displaced from the coil, whereby the weight of the moving coil may, therefore, be utilized to balance a long or heavy pointer with, or without, the addition of counter-balance weights. With this design, wherein two magnets are employed rather than a single magnet, as in conventional end pivot coil instruments, the length of the individual magnets is less than the length of the single magnet in prior art instruments, for the same flux density in the air gap. With the coil surrounding one short magnet in my instrument, rather than a long magnet in prior art arrangements, it will be apparent that the coil end turns are of less length than in prior art instrument designs. Since a greater percentage of the coil length is located in a flux gap, as compared to the above-mentioned end pivoted coil instruments, a more efficient distribution of coil resistance is obtained with my design.

The support for the coil includes a pair of bracket supports, which are generally U-shaped in transverse cross-section, fastened to the coil end turns in the usual manner and extending outwardly beyond the side of the coil. Unlike prior art instruments, the bracket supports extend substantially the entire length of the end turns to thereby protect the coil thereat. Further, in accordance with my invention, additional support is provided for the parallel extending coil bracket supports by means of a generally U-shaped section of a pointer system; the parallel arm portions of which section are secured to the extending portion of the coil bracket supports, while the connecting portion between the parallel arms is secured to the one side of the coil. A very sturdy moving system is provided by such construction, which is particularly adapted for high torque instrument use.

In accordance with my invention, bridge members of the cantilever type are integrally formed on the inner yoke member of the instrument magnetic system. Adjustable jewel screws, for the support of ring jewel bearings are mounted in the said bridge. By using close fitting ring jewels and pivots, fallover is negligible. Further, with the novel integral bridge and magnetic structure of my invention, close alignment of the pivot axis and flux gap is possible whereby the instrument may be constructed with a minimum radial length flux gap.

A pair of adjustable, screw-type, pointer stops are carried by the supporting structure for one of the cantilever bridge members which stops are adapted to limit the rotary movement of the instrument moving system. The said screws are easily accessible for convenient adjustment of the extreme pivotal limits of the movable mechanism.

An object of this invention is the provision of a high torque electrical instrument employing a pair of magnets in the magnetic system thereof.

An object of this invention is the provision of an electrical instrument of the self-shielding type which has a high torque and which is particularly suited for aircraft use.

An object of this invention is the provision of an electrical instrument in which the pivot axis is displaced from the side of the coil whereby the weight of the coil functions to counter-balance a long and/or heavy pointer assembly.

An object of this invention is the provision of an improved coil supporting and pointer assembly construction in which a generally U-shaped section of the pointer assembly is secured to one side of the coil and to a pair of parallel bracket supports attached to the coil ends and extending therefrom.

An object of this invention is the provision of a novel yoke member for use in an instrument magnetic system, which yoke has integrally formed thereon a pair of cantilever bridge members for the support of the instrument moving system.

An object of this invention is the provision of a pair of bridge members integrally formed on the magnetic system of a moving coil instrument, by means of which arrangement a close alignment of the pivot axis and air gap is made possible whereby the overall radial length of the gap may be reduced to a minimum.

An object of this invention is the provision of an electrical instrument in which no part of the instrument extends above or below the top and bottom surfaces, respectively, of the instrument yoke member, whereby the instrument may be mounted against a flat mounting plate, for example, without provision for protruding members or parts.

These and other objects and advantages will become apparent from the following description when taken with the accompanying drawings. It will be understood the drawings are for purposes of illustration and are not to be construed as defining the scope or limits of the invention, reference being had for the latter purpose to the appended claims.

In the drawings wherein like reference characters denote like parts in the several views:

FIGURE 1 is a fragmentary top plan view of the essential elements of a dual magnet electrical instrument mechanism embodying my invention;

FIGURE 2 is a vertical cross-sectional view of the mechanism; and

Figure 3:
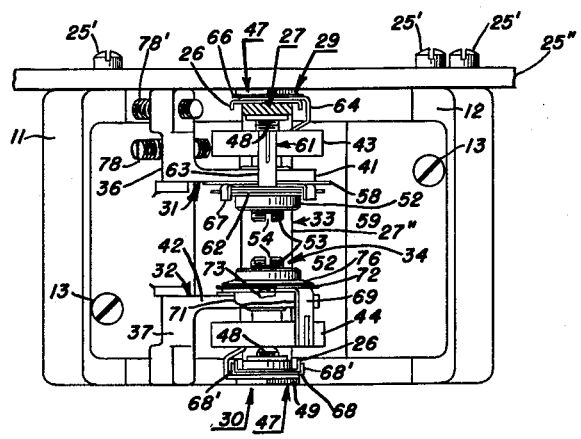
FIGURE 3 is a view of the mechanism showing the outer surface of the straight yoke member, with parts shown broken away for clarity, and showing the mechanism secured to a plane mounting plate.

Reference is now made to the drawings wherein there is shown an electrical instrument which embodies my invention, which instrument has included therein a magnetic structure assembly comprising a two-piece yoke 10 which includes a generally U-shaped outer yoke member 11 and straight inner yoke member 12 spanning the spaced free ends of the member 11 and secured thereto as by screws 13, 13 which extend through holes formed in ears 12', 12' on the member 12 and threadedly engage tapped holes in the yoke member 11. The yoke members are made of suitable magnetic material, such as soft-iron, with the yoke forming an enclosure within which enclosure a pair of magnets 16 and 17 are located; the one magnet 16 being suitably secured within a cutout portion 18 in the outer end of the yoke member 11 while the other magnet 17 is suitably secured to the diametrically opposite inner yoke member 12. Pole shoes 21 and 22 may be secured to the adjacent ends of the magnets 16 and 17, respectively, the concave and convex spaced surfaces of the respective pole shoes forming an arcuate flux gap within which one side 23' of a movable coil 23 may operate. The magnets may be magnetized as indicated, for example, by the polar markings N and S, whereby a series aiding flux of high density is created in the air gap.

It will here be noted that the one magnet 17 comprises a core of the magnetic system, with the coil 23 surrounding the same and the attached yoke member 12. In prior art single flux gap instruments employing one long magnet comprising the core of the magnetic system, the coil end turns are necessarily longer than in the instrument of my design wherein the coil surrounds only one relatively short magnet. Consequently, in prior art high torque instruments, there is a larger amount of wasted copper in the moving coil on the end turns. Since the coil of my instrument has end turns of shorter length, the wasted copper in the coil is smaller.

The yoke member 11 is provided with a plurality of threaded mounting holes 25 (see particularly FIGURE 1) for receiving bolts 25', or the like, for holding the yoke member in place on a plane base 25" which may form part of an instrument housing, or the like. In accordance with my invention, no part of the instrument mechanism proper extends above the upper surface of the yoke member 11 in which the holes 25 are formed. Thus, it will be understood that the mechanism may be easily mounted on a plane, flat, mounting plate. As seen in FIGURE 3, no part of the instrument mechanism proper extends below the bottom surface of the yoke member 11. Thus, it will be apparent that mounting holes 25 could be provided in the yoke member 11 at the bottom side thereof and the mechanism secured to a mounting plate at the bottom side thereof. Regardless of where the mechanism is mounted, the instrument of my invention is characterized in that no part of the instrument proper extends above or below the top or bottom face, respectively, of the yoke member 11. Obviously, the instrument pointer may be shaped to extend above or below the plane of the top and bottom surfaces of the yoke member 11 without interfering with the mounting of the instrument on a plane mounting surface or departing from the scope of the invention.

The coil 23 may be wound upon a coil frame 24, made of aluminium, or other suitable non-magnetic material. The coil and frame are supported by a pair of bracket supports 26, 26 of U-shaped cross-section for strength, attached to the ends of the coil and frame and extending outwardly beyond the one coil side 23". One feature of my invention includes extending the brackets to substantially the end 23' of the coil to both add rigidity to the coil structure and to protect the coil end turns from inadvertent damage. The added rigidity is of particular use in high torque mechanisms where undesired twisting torques are encountered. Further, in accordance with my invention, additional support for the extending channel-shaped brackets 26, 26 is provided by means of the U-shaped section 27 of a pointer system, designated 28; the said parallel arm portions 27', 27' of the section 27 being suitably secured to the parallel extensions of the channel members 26, 26 and the connecting portion 27" thereof being secured to the one side of the said coil, as by cementing, or the like. (Only a fragmentary portion of the pointer system and U-shaped section 27 is shown, for clarity.) Suitable insulating members 26', 26' are positioned between the channel shaped supporting brackets 26, 26 and the coil ends. A very rigid moving system results from the use of the U-shaped section 27 on the pointer system 28 and the above-described channel members, or brackets, 26, 26 which extend for substantially the entire length of the coil ends. Not only is the coil supported along both ends and the one side 23" thereof, but the connected arms 27', 27' attached to the brackets 26, 26 provide added support and rigidity thereto. In addition, as seen in the drawings and described hereinbelow, the arms 27', 27' provide strong support for the novel coil pivot assemblies 29 and 30 carried thereby.

In accordance with my invention, a novel bridge construction comprising upper and lower cantilever bridge members 31 and 32 are integrally formed on the inner yoke member 12, which bridge members carry bearing assemblies 33 and 34, respectively, for the support of pivots included in the pivot assemblies 29 and 30. The cantilever bridge members 31 and 32 comprise generally axially oriented, spaced apart, legs 36 and 37 which extend outwardly from the yoke member 12, and generally transversely oriented and parallel arms 41 and 42 extending from the outer ends of the legs 36 and 37, respectively. The arms 41 and 42 are spaced outwardly from the outer face of the yoke member 12 to provide clearance space for the arcuate movement of the said one side 23" of the coil 23 between the said bridge arms and inner yoke. In addition, as seen in FIGURES 2 and 3, the spaced apart bridge arms 41 and 42 are located a spaced distance from the top and bottom of the instrument to provide room for the upper and lower spiral springs 43 and 44, respectively; the said spiral spring 43 being located between the bridge arm 41 and the adjacent arm portions 27' of the pointer system, while the spiral spring 44 is located between the other bridge arm 42 and adjacent arm portion 27' of the pointer system. The upper spiral spring 43 surrounds portions of the upper pivot and bearing assemblies 29 and 33, respectively, while the lower spiral spring 44 surrounds portions of the lower pivot and bearing assemblies 30 and 34, respectively.

The novel pivot assemblies 29 and 30 each comprises an internally threaded hub 46 press-fitted in coaxial holes formed in the arm portions 27', 27' of the pointer system. The channel members 26 and insulating members 26' are provided with apertures coaxial with the said holes in the arm portions 27', 27'. Bushings 47, each comprising an externally threaded shank portion 48 and hexagonal head 49, extend through the holes formed in the channel members 26 and insulating members 26', with the shank 48 threadedly engaging the said hub members 46. Each bushing 47 is provided with an axial bore to receive a pivot 51. The pivots operate within the ring bearing assemblies 33 and 34, each of which comprises an internally threaded hub 52, staked to the upper and lower bridges 33 and 34. Threaded cylinders 53, each having a kerf or slot 54 in the inner end thereof, threadedly engage the hubs 52, and support ring and end jewels 56 and 57, respectively, (only the details of lower bearing assembly being shown in FIGURE 2). Although not shown, the end jewels may be spring-backed for ruggedization of the instrument.

Inasmuch as the spiral springs 43 and 44 are adapted to carry the electric current to the movable coil, it is necessary to insulate the current connection to one from the connection to the other spiral spring. For that purpose, the upper hub 52 has insulating washers 58 and 59 on opposite sides of the spring abutment 61. Such abutment has a hole diameter significantly larger than the outside diameter of the hub 52 and, consequently, the abutment is insulated from the upper hub 52. A flat washer 62 is positioned between the shoulder 52' on the hub 52 and the insulating washer 59, and the flat and insulating washers and abutment 61 are axially resiliently biased between the bridge arm 41 and hub shoulder 52' by means of resilient arms (not shown) formed on the abutment 61 about the hub 52. The outer end of the spiral spring 43 is secured, as by soldering, for example, to the outwardly directed end 63 of the abutment 61 while the inner spring end is similarly connected to an angular lug, or spring abutment, 64 mounted on the upper bushing 47 between the upper channel shaped support 26 and an insulating washer 66, which washer also abuts the hexagonal head 49 of the said bushing. It will be understood that one end of the movable coil wire is soldered to the upper channel bracket 26 while the other wire end is soldered to the lower such bracket. The aperture in the upper bracket 26 is significally larger than the outside diameter of the shank portion 48 of the upper bushing 47 so as to be electrically insulated therefrom. It will be apparent that electrical connection to one end of the coil 23 may be made by connection to the inwardly directed end 67 on the abutment 61; the electrical circuit being traced from the abutment end 67, through the abutment 61 to the abutment end 63, through the spiral spring to the lug 64, from the lug 64 to the upper channel bracket 26 and thence to one end of the coil wire.

The structure at the lower pivot and bearing assemblies 30 and 34, respectively, is similar to that at the upper assemblies except that there are no insulating washers thereat since the spiral spring 44 is grounded. The inner end of the spiral spring 44 is secured to an angular lug 68 mounted on the lower bushing 47 between the lower channel support 26 and the hexagonal head 49 of the said bushing. It will here be noted that, as shown in FIGURE 2, the lug 68 is provided with parallel arms 68' which abut the sides of the channel support member 26 adjacent thereto for a non-rotatable connection therebetween. The outer end of the spiral spring 44 is secured to a lug 69 mounted on the lower hub 52 between a zero adjuster lever 71 and a washer 72 having an axially extending tab 73 formed thereon. The tab 73 extends through a hole 74 formed in the lever 71 and is thereby adapted to be rotated upon rotation of the said lever. (In FIGURE 3, only a fragmentary portion of the zero adjuster lever is shown, for clarity.) A spring washer 76 between the head 52' on the lower hub 52 and the washer 72 resiliently presses the washer 72, lug or abutment 69 and zero adjuster lever 71 together and against the lower bridge arm 42 of the bridge 32. The abutment 69 which is in tight frictional engagement with the said washer 72 and lever 71 is rotated upon rotation of the said lever and connected washer 72 for zero correction of the instrument.

The construction of the above-described pivot assemblies differs from prior art pivot assemblies in that each includes an externally-threaded shank with a head formed at one end thereof, with spring abutment members, or lugs 64 and 68 mounted on the said shanks between the head and brackets. Unlike prior art pivot assemblies, no nut is located in the threaded shank portion to hold the spring abutment. With my design, the internally-threaded hubs 46, 46 are press-fitted in the coil supporting mechanism, and the pivot bushing 47, 47 threaded into the hubs, with the spring abutments positioned between the bushing heads and the coil supporting brackets. Such an arrangement is extremely easy to assemble.

It will here be noted that by locating the spiral springs 43 and 44 inside the extending ends of the channel brackets 26, 26, the springs are protected by such brackets from damage due to inadvertent touching and bending thereof. The mechanism is easily handled during the construction, installation and repair thereof, without the necessity of special precautions, since the most easily damaged elements of the mechanism, such as the spiral springs and coil, are well protected. Further, the mechanism may be laid on a flat supporting surface with either the top or bottom of the yoke member 11 resting against such surface without damage thereto since no part of the instrument proper protrudes above or below the top or bottom plane, respectively, of the yoke member 11.

The construction of the adjustable pointer stop mechanism is also different from prior art constructions, as is best shown in FIGURES 1 and 3. Such pointer stop arrangement comprises a pair of externally threaded screws 78 and 78' mounted in threaded holes formed in the leg portion 36 of the said cantilever bridge member 31. The outer end of each of the screws 78 and 78' is provided with a slot or kerf 79 and 79', respectively. A semi-cylindrical bumper member 81, of suitable material, is secured to the connecting portion 27" of the pointer assembly 27 against which the end of the stop member 78 is adapted to abut to limit the counter-clockwise movement of the moving system of the instrument, as viewed in FIGURE 1. A cylindrical second bumper member 82 is secured to one of the forwardly extending balance arms 83 of the pointer system against which the end of the stop member 78' is adapted to abut to thereby limit the clockwise rotation of the pointer. The slotted ends of the adjustable screw pointer stops are easily accessible for rotation of the screw stops whereby adjustment of the deflection limits of the moving system is easily and conveniently accomplished.

As seen in FIGURE 1, the balance arms 83, 83 are threaded at the free ends thereof for the reception of balance weights (not shown) if such weights are necessary to balance the moving system.

As noted above, one advantage of utilizing two magnets 16 and 17 in the instrument construction is that a high torque mechanism may be obtained with the use of coils having relatively short end turns, compared to prior art instruments wherein the coil surrounds a single magnet which is much longer than the magnet 17. The advantages of the use of the U-shaped section 27 in the pointer system 28 for rigidity of the moving system has also been mentioned above, as have the advantages of brackets 26, 26 which extend substantially the entire length of the moving coil ends for rigidity and protection of the end turn wires. The integral construction of the dual cantilever bridge members 31 and 32 of the instrument bridge with the yoke portion 12 will become apparent when it is realized that the flux gap between the pole shoes 21 and 22 may be precisely and accurately located with respect to the abutting mating surfaces between the yoke portions 11 and 12. The magnetic system with its large and easily machinable parts is amenable to precision construction. The hole in the cantilever bridge which extends through both bridge members for the support of the bearing assemblies may then be easily precisely located with respect to the magnetic flux gap. Close fitting ring jewels are employed to reduce fallover to a minimum, and, as a result of the above factors, the radial air gap length may be reduced to a minimum. A minimum length air gap, obviously, provides for a high torque instrument.

It will be noted that, as seen in FIGURES 1 and 3, the area to the right of the dual cantilever bridge members 31 and 32 is unobstructed, into which area other components of the instrument housing, or the like, may extend without interfering with the mechanism operation. Further, the mounting arrangement between the yoke members is symmetrical whereby the said yoke member 12 may be secured to yoke member 11 with the legs of the cantilever bridge members located to the right of the pivot axis, as viewed in FIGURES 1 and 3, if desired.

Having now described my invention in detail in accordance with the requirements of the patent statutes, various changes and modifications will suggest themselves to those skilled in this art, and it is intended that such changes and modifications shall fall within the spirit and scope of the invention as recited in the following calims.

I claim:

1. A magnetic structure comprising a pair of magnets each having opposed polar surfaces, the polar surfaces of opposite polarity of the magnets being positioned a spaced distance apart to form a flux gap therebetween, a yoke of magnetic material contacting and forming a return path for the magnetic flux between the other polar surfaces of the magnets, a pair of bridge members integrally formed with and disposed on the outer portion of the yoke, a moving system comprising a coil surrounding only one of the magnets and a portion of the yoke, and means pivotally mounting the coil on the said bridge members, one side of the said coil being angularly movable in the said flux gap.

2. An electrical instrument comprising a pair of magnets each having opposed polar surfaces, the opposite polarity polar surfaces of the magnets terminating a spaced distance apart and forming a magnetitc flux gap, a yoke of magnetic material enclosing and contacting the other polar surfaces of the magnets, a moving system comprising a coil surrounding only one of the said magnets, one side of the coil being angularly movable in the said magnetic flux gap, a bridge comprising a pair of cantilever bridge members integrally formed with and disposed on on the outer portion of the yoke, and means pivotally mounting the said coil on the said bridge members about a pivot axis outside of the enclosing yoke.

3. The invention as recited in claim 2 including externally threaded stop members mounted in tapped holes formed in the said bridge, the said stop members engaging the said moving system to limit the movement thereof in opposite rotary directions.

4. An electrical instrument comprising a yoke of magnetic material which includes a generally U-shaped member closed at the open end thereof by a generally straight member, first and second magnets each having opposed polar surfaces, opposite polarity polar surfaces of the said magnets abutting the yoke members, the other opposite polarity surfaces of the magnets terminating a spaced distance apart and forming a magnetic flux gap therebetween, a pair of cantilever bridge members integrally formed with the said straight yoke member and having ends spaced from said member and disposed outside the space enclosed by said yoke, a coil having first and second sides passing through the respective flux gap and the space between the bridge members, ends and the straight yoke member, and means pivotally mounting the coil on the said bridge members and outside of said yoke-enclosed space.

5. A pointer system for the support of a single coil for an electrical instrument, the said system including a pair of supporting brackets attached to opposite ends of the coil and extending generally parallel therefrom, a generally U-shaped member comprising generally parallel arm portions connected by an interconnecting portion, means securing the said parallel arm portions of the said U-shaped member to the said parallel supporting brackets along the portion of the said parallel supporting brackets which extend from the coil thereby providing bases for attachment of pivot assemblies, and means securing the interconnecting portion of the said U-shaped member to one side of the said coil, one of the said parallel arm portions of the said U-shaped member being integrally formed with a pointed portion and a pair of balance arms extending therefrom.

6. The invention as recited in claim 5 including pivot assemblies secured to the connected arm portions of the U-shaped member and parallel extending bracket supports.

7. An electrical instrument comprising a pair of magnets each having opposed polar surfaces, one pair of opposite polarity polar surfaces of the magnets terminating a spaced distance apart and forming a magnetic flux gap, a yoke of magnetic material and including a generally U-shaped member closed at the open end thereof by a generally straight member, the other pair of opposite polar surfaces of the magnets abutting the yoke members, a bridge comprising a pair of cantilever bridge members integrally formed on the said straight yoke member and having ends spaced from the end member, a coil having first and second sides passing through the respective flux gap and the space between the bridge and straight yoke member, a pointer system including a pair of supporting brackets attached to opposite ends of the coil and extending generally parallel therefrom, an integral generally U-shaped member which includes a pair of generally parallel extending arm portions interconnected at the ends thereof by an interconnecting portion, means securing the said parallel arm portions of the said U-shaped member to the said parallel supporting brackets, first and second pivot assemblies secured to the said generally parallel extending arm portions of the U-shaped member, first and second pivot bearings secured to the said cantilever bridge members, means rotatably supporting the pivot assemblies in the supporting pivot bearings, and adjustable screw pointer stops threadedly secured to the said bridge, the said pointer stops limiting relative rotary movement of the coil and attached pointer system by engagement of the said pointer stops with the pointer ssytem.

References Cited in the file of this patent

UNITED STATES PATENTS

| | | |
|---|---|---|
| 2,798,200 | Swan | July 2, 1957 |
| 2,840,782 | Ammon | June 24, 1958 |
| 2,896,167 | Huber | July 21, 1959 |
| 2,910,631 | Ammon | Oct. 27, 1959 |
| 2,980,857 | Langford | Apr. 18, 1961 |

FOREIGN PATENTS

| | | |
|---|---|---|
| 20,459 | Switzerland | Apr. 25, 1899 |
| 787,424 | France | Sept. 23, 1935 |
| 643,589 | Great Britain | Sept. 20, 1950 |